March 17, 1925.

W. J. MacARTHUR

OIL AND WATER SEPARATOR

Filed Dec. 17, 1923

1,530,087

INVENTOR:
WILLIAM J. MACARTHUR,
BY
Graham + Harris
ATTORNEYS.

Patented Mar. 17, 1925.

1,530,087

UNITED STATES PATENT OFFICE.

WILLIAM J. MacARTHUR, OF LOS ANGELES, CALIFORNIA, ASSIGNOR OF ONE-HALF TO REA E. MAYNARD, OF LOS ANGELES, CALIFORNIA.

OIL AND WATER SEPARATOR.

Application filed December 17, 1923. Serial No. 681,120.

*To all whom it may concern:*

Be it known that I, WILLIAM J. MAC-ARTHUR, a subject of the King of Great Britain, residing at Los Angeles, in the county of Los Angeles and State of California, have invented a new and useful Oil and Water Separator, of which the following is a specification.

This invention relates to a device for separating oil from water. There are numerous uses for a device of this character, several of which will be hereinafter enumerated.

Oil received from producing wells often contains water which settles out of the oil in the storage tanks. The amount of water settling in any certain storage tank varies with the flow of oil and the proportion of water carried in the oil. It has, therefore, been previously impossible to gauge the draining of water from oil tanks. The invention provides a means whereby the water will be allowed to discharge from the oil tank as it collects, but which device is so constructed that it will prevent the passage of oil. By the use of the device, the amount of water at the bottom of the oil tank is kept at a minimum, thus making it possible to gauge the quantity of oil contained in the tank by noting the height thereof.

A further use of the device and one which is of considerable importance is in the separation of oil from bilge water and ballast water which is to be discharged from a vessel. With the increasing use of oil as ship fuel and the transportation of oil by tank vessels, the problem of pollution of harbor and beach waters with oil has assumed considerable magnitude. The invention provides a simple means whereby the ballast liquid and water being discharged from the bilge are treated in a manner to remove all oil therefrom, which oil is thus reclaimed and may be used as fuel in the ship's boilers.

It is an object of the invention to provide a device which provides a wall having narrow elongated slots or openings therein, these slots being of such width that water will pass therethrough, but which will prevent the passage of oil.

A further object of the invention is to provide a wall of this character having slots disposed at an angle to the vertical direction in which sediment moves in settling from a liquid body, thus preventing the settling of sedimentary substances in the elongated slots, so that they will not quickly become clogged.

It is a further object of the invention to provide a separator of simple construction which may be attached to any container from which it is desired to remove water, but from which the exit of oil is undesirable.

The especial advantages of the invention and further objects thereof will be made evident hereinafter.

Referring to the drawing which is for illustrative purposes only:

Figure 4:
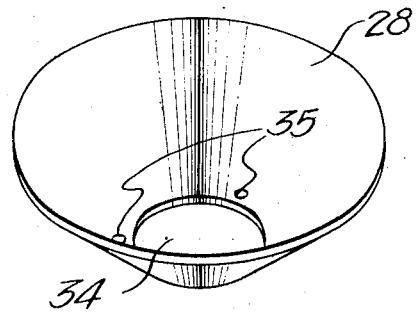
Fig. 4 is a perspective view of one of the conical plate members.

As shown in the drawing, the invention provides a casting 13 having a dividing wall 14 which separates the interior of the casting into an upper chamber 15 and a lower chamber 16 which communicate through an opening 18. The upper chamber 15 is closed by a cover plate 19 which may be secured by bolts 20 or other suitable means. The chamber 15 is divided by an annular wall structure 22 into an inlet chamber 23 and the outlet chamber 24 from which a discharge pipe 25 equipped with a valve 26 extends. The wall structure 22 is composed of a multiplicity of conical plates 28 which are held in separated disposal by shims 29 in the form of washers held in position by screws 31 which hold the plates 28 together and which are threaded into the dividing wall 14 as indicated at 33. Each of the plates 28 is provided with a simple opening 34, which openings align and form a central passage in communication with the opening 18 of the dividing wall 14. The members 28 which are shown in Fig. 4 are punched with holes 35 for receiving the screws 31 by which they are secured in wall formation. These plates, when in place, are in inverted position so that the spaces 36 existing therebetween slope downwardly and inwardly with respect to the vertical axis of the central passage enclosed by the wall 22.

Figure 1:
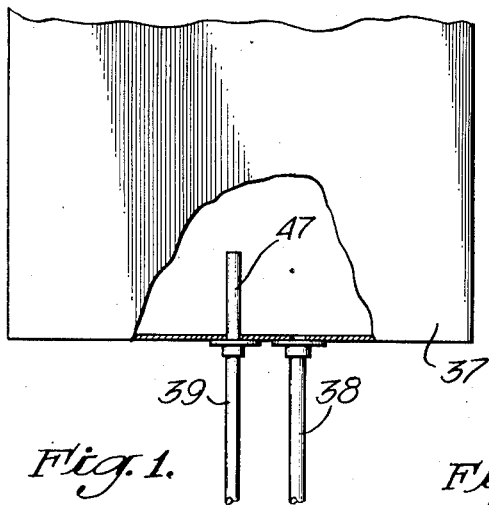
Fig. 1 is an elevational view showing a tank having an oil separator attached thereto.
Figure 3:
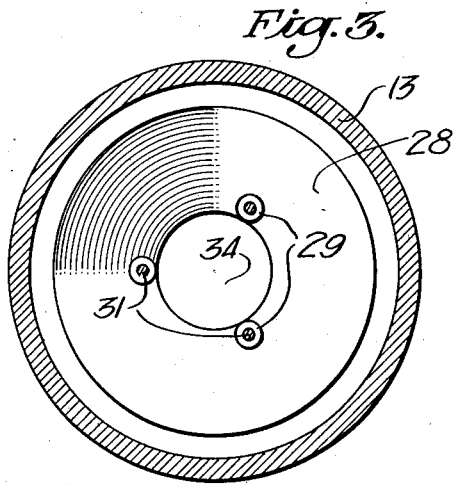
Fig. 3 is a section taken as indicated by the line 3—3 of Fig. 2.
Figure 2:
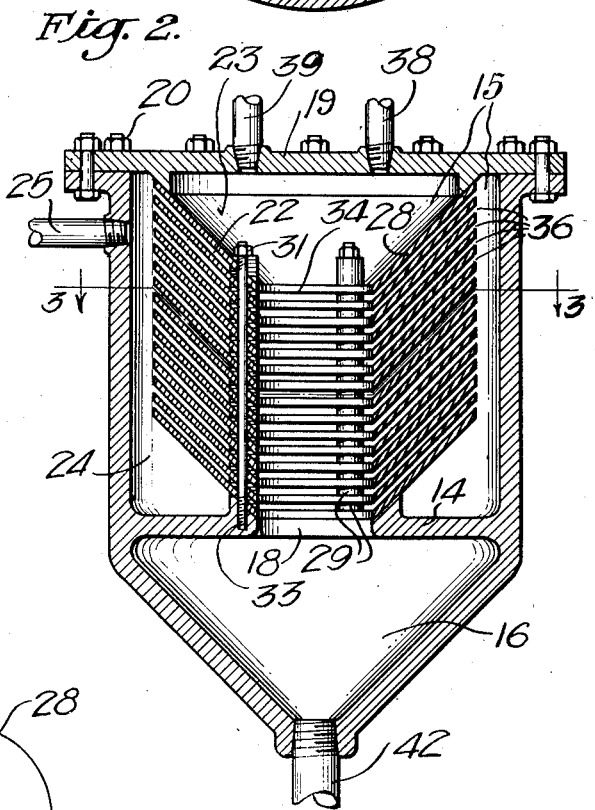
Fig. 2 is a vertical section through the separator.

The separator is arranged for connection with any tank, such as indicated in fragment at 37 in Fig. 1, by means of a feeder pipe 38 and a skimmer pipe 39, both of which screw into openings 40 and 41 in the cover plate 19. The water in the tank 37, being heavier than oil, tends to settle to the bottom thereof and passes downwardly through the pipe 38 into the inlet chamber 23 of the separator, causing the filling of the sediment chamber 16 with water, and flows outwardly through the narrow slots 36 between the plates 28 into the outlet chamber 24, from whence it flows off through the discharge pipe 25. The water, on being discharged from the tank 37 through the pipe 38, is followed by oil, which oil upon reaching and filling the inlet chamber 23 of the separator is blocked by the wall 22.

I have found that by an arrangement of plates such as shown, that water will pass freely through the slots 36 therebetween, but that oil will be prevented from passage therebetween. The reason for this action is not definitely determined, but apparently is due to the surface tension of water contained between the plates, this surface tension resisting the passage of oil; or the action may be considered as anti-capillary in nature with respect to oleaginous substances.

Sediment contained in a liquid body in the inlet space 23 and in the spaces 36 between the plates will settle downwardly through the central passage of the wall 22 and will pass through the opening 18 into the sediment chamber 16, from which it may be drawn off at frequent intervals through a pipe 42, the flow of which is controlled by the valve 43. By placing the discharge piping at a position near the top of the casting 13, it is possible to retain a body of water in the outlet chamber 24 at all times, which will serve to keep the faces of the plates 28 thoroughly wet.

It will be noticed that the pipe 39 extends upwardly into the tank 37, as indicated at 47. When more water is delivered into the tank and settles to the bottom thereof, it will flow downwardly through the pipe 38, forcing the oil upwardly through the pipe 37. In settling through the inlet chamber of the separator, the water displaces the oil contained therein and passes outwardly between the plates 28, whereupon the chamber 23 is again occupied by oil which is prevented from passage by the separator wall 22. By placing the plates 28 in angular disposition, which is made possible by the use of conically shaped rings as shown, it is possible to eliminate a greater portion of interference which might arise through the clogging of the spaces 36 by foreign or sedimentary substances.

I claim as my invention:

1. In a separator of the class described, the combination of: means for confining liquid materials; and a wall in the lower part of said means having openings therethrough, disposed obliquely with respect to vertical, of such width that aqueous fluids will pass therethrough, but through which oleaginous fluids will not pass.

2. In a separator of the class described, the combination of: means for confining liquid materials; and a wall in the lower part of said means having narrow elongated openings therethrough, disposed obliquely with respect to vertical, of such width that aqueous fluids will pass therethrough, but through which oleaginous fluids will not pass.

3. In a separator of the class described, the combination of: means for confining liquid materials, and a substantially vertically disposed wall having water openings which advance downwardly and inwardly through said wall in such a manner that sedimentary substances will not enter into said openings in settling.

4. In a separator of the class described, the combination of: means for confining liquid materials; and a substantially vertically disposed wall having narrow elongated slots forming water openings which advance downwardly and inwardly through said wall in such a manner that sedimentary substances will not enter into said openings in settling.

5. In a separator of the class described, the combination of: a shell enclosing a space; a separator wall dividing said space into an inlet chamber and an outlet chamber, said separator wall consisting of plates spaced apart and angularly disposed relative to a vertical axis to provide water openings sloped at such an angle to the direction of settling of sedimentary substances, that such substances in settling will not enter into said openings; means for delivering an oil and water mixture into said inlet chamber; and means conducting away the separated water from said outlet chamber.

6. In a separator of the class described, the combination of: a shell enclosing a space; a separator wall dividing said space into an inlet chamber and an outlet chamber, said separator wall consisting of conoidal plates arranged substantially vertically and spaced apart to provide annular water openings sloped at such an angle to the direction of settling of sedimentary substances, that such substances in settling will not enter into said openings; means for delivering an oil and water mixture into said inlet chamber; and means conducting away the separated water from said outlet chamber.

7. In a separator of the class described, the combination of: a shell enclosing a space; a separator wall dividing said space into an inlet chamber and an outlet chamber, said separator wall consisting of conoidal plates arranged substantially vertically and spaced apart to provide annular water openings sloped at such an angle to the direction of settling of sedimentary substances, that such substances in settling will not enter into said openings; means for delivering an oil and water mixture into said inlet chamber; and means conducting away the separated water from said outlet chamber; and walls enclosing a sediment chamber communicating with the lower portion of said inlet chamber in a position of alignment with said separator wall.

8. In a separator of the class described, the combination of: means for confining liquid materials; and a wall in said means having openings therethrough, disposed obliquely with respect to vertical, of such width that aqueous fluids will pass therethrough, but through which oleaginous fluids will not pass.

In testimony whereof, I have hereunto set my hand at Los Angeles, California, this 11th day of December, 1923.

WILLIAM J. MacARTHUR.